United States Patent [19]

Morse

[11] 4,208,116

[45] Jun. 17, 1980

[54] METHOD AND APPARATUS FOR OPENING A FILM CARTRIDGE

[75] Inventor: John E. Morse, Rochester, N.Y.

[73] Assignee: Eastman Kodak Company, Rochester, N.Y.

[21] Appl. No.: 945,166

[22] Filed: Sep. 25, 1978

[51] Int. Cl.$^{2}$ ........................ B23P 19/04; G03B 17/26
[52] U.S. Cl. .................................... 354/275; 29/426.4
[58] Field of Search ............... 354/275, 276, 278, 281; 250/475, 480; 29/427, 806

[56] References Cited

U.S. PATENT DOCUMENTS

| | | | |
|---|---|---|---|
| 2,900,514 | 8/1959 | Boucher | 354/276 X |
| 3,470,642 | 10/1969 | Mundt et al. | 40/152 |
| 3,511,990 | 5/1970 | Hauss | 250/480 |
| 3,579,801 | 5/1971 | Ishihara | 29/427 |
| 3,910,692 | 10/1975 | Scibilia | 354/275 X |
| 4,134,144 | 1/1979 | Ragle et al. | 360/133 |
| 4,152,739 | 5/1979 | DeMoss et al. | 360/98 |

FOREIGN PATENT DOCUMENTS

| | | | |
|---|---|---|---|
| 511738 | 4/1953 | Canada | 354/275 |
| 2612352 | 10/1977 | Fed. Rep. of Germany | 354/275 |

*Primary Examiner*—Donald A. Griffin
*Attorney, Agent, or Firm*—J. A. Morrow

[57] ABSTRACT

A film cartridge for enclosing a photosensitive film disk within a light-tight chamber defined by opposed walls which are sealed together to encapsulate the film disk. When the cartridge is positioned in opening apparatus, force-applying members inserted through passages in one of the walls of the cartridge are moved into contact with the opposed wall. Continued movement of the members displaces the opposed wall sufficiently to rupture it and/or a seal joining the walls. A wall-separating member of the opening apparatus is inserted into the rupture and moved between the opposed walls to extend the rupture and space the walls by a distance sufficient to permit the film disk to be removed from the cartridge.

17 Claims, 11 Drawing Figures

FIG. 8
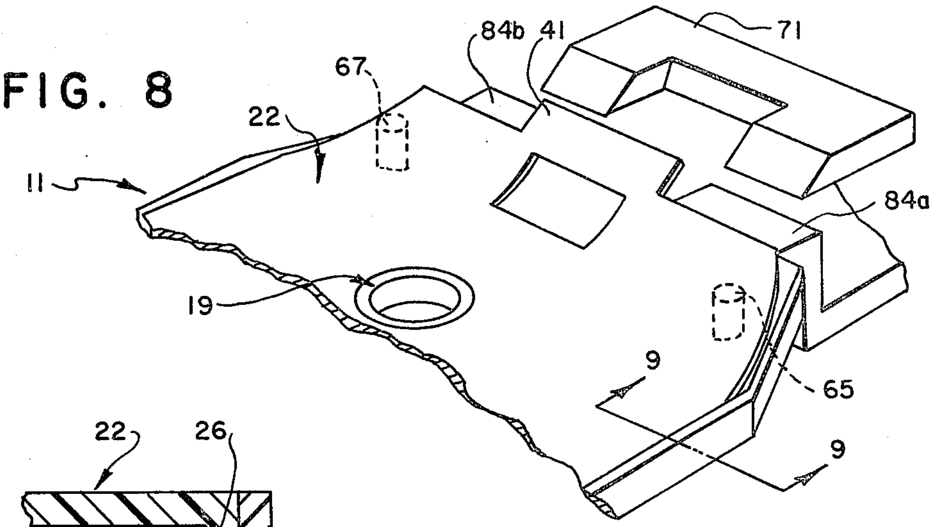
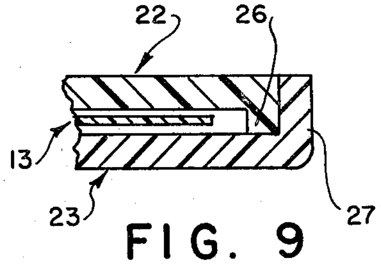
FIG. 9
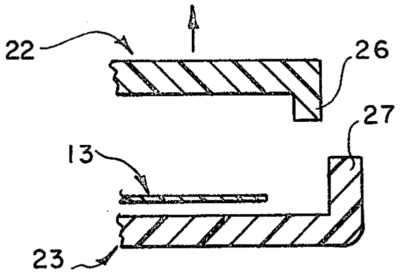
FIG. 11
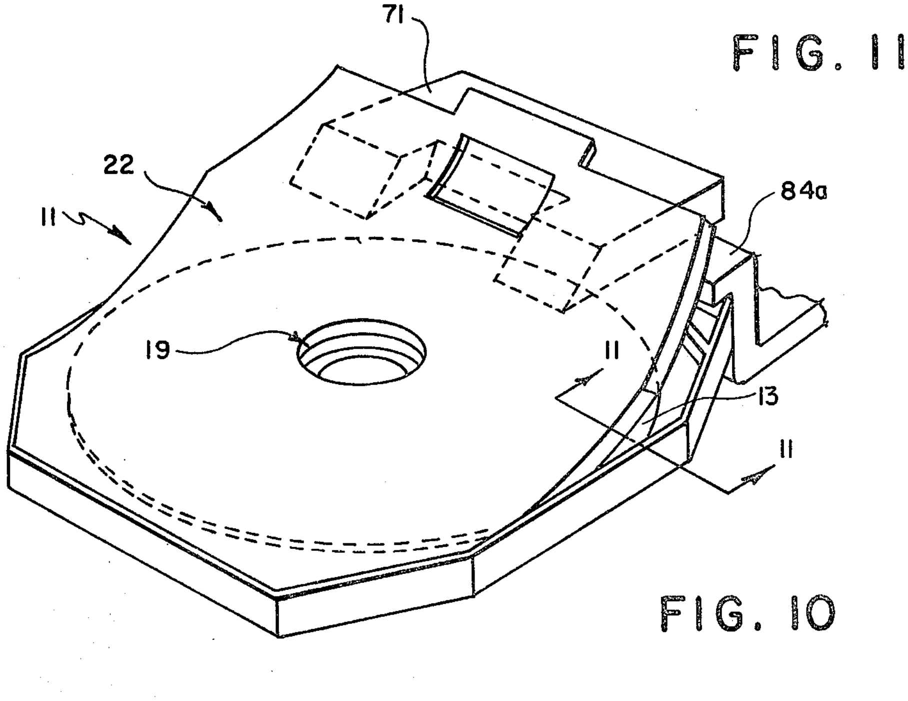
FIG. 10

METHOD AND APPARATUS FOR OPENING A FILM CARTRIDGE

CROSS REFERENCE TO RELATED APPLICATIONS

Reference is made to commonly-assigned copending U.S. Patent Application Ser. No. 948,367 entitled FILM PACKET, filed Oct. 4, 1978 in the name of Frederick W. Harvey and Gurdip S. Sethi.

BACKGROUND OF THE INVENTION

The present invention relates generally to film cartridges and to a method and apparatus for opening such cartridges to permit removal of a film member. More specifically, the invention relates to a film cartridge for enclosing a photosensitive film in a disk format and to a method and apparatus for opening the cartridge to permit removal of the film disk for photofinishing.

Description of the Prior Art

Film cartridges and magazines having light-tight chambers for supporting photosensitive film members are generally well known in the photographic art. As many of the early film cartridges were relatively expensive to produce, they were usually adapted to be reloaded by photofinishers. Sections of the film cartridges were usually joined by removable fasteners which permitted the cartridge to be opened without damage or destruction of the sections. For example, the early cartridge or film holder disclosed in U.S. Pat. No. 2,446,200 comprised two generally parallel wall sections which were joined by a plurality of hollow rivets positioned around the peripheral edge. Following exposure of images onto the enclosed film disk, the holder was sent to a photofinisher for removal of the exposed film disk and reloading of the film holder with an unexposed film disk. To open the film holder, the hollow rivets were removed by a punch press and the sections of the holder were separated in an undisclosed manner to permit removal of the film disk from the chamber.

Many of the film cartridges produced in more recent years have not been adapted for reloading as the walls of the cartridges have been permanently sealed to permit the cartridges to withstand considerable abuse and tampering. To remove the film member from such cartridges, mechanical opening devices usually cut or tear away a portion of the cartridge to permit access to the film member. Representative devices for opening such cartridges to permit removal of the film members are disclosed in U.S. Pat. Nos. 3,265,263; 3,429,042; 3,487,966; 3,550,877; 3,579,801; 3,580,443; and 3,584,380. While many of the prior art devices offer desirable features, it will become apparent from the following specification that such devices lack significant advantages presented by the structure of the present invention. In most cases, for example, the prior openers are not entirely suitable for opening thin film cartridges having walls joined together proximate their peripheral edges.

Also known in the prior art are film transparency holders which have some characteristics similar to film cartridges. For example, U.S. Pat. No. 3,341,960 and French Pat. No. 1,311,727 disclose transparency holders having opposed, generally parallel frame members which support a processed film transparency. As disclosed in these patents, a processed film transparency can be moved through an enlarged slot defined between the opposed frame members of the transparency holder.

To enlarge the slot and permit insertion or removal of the transparency, a spreading mandrel is inserted through passages formed in a frame member and into contact with the opposed frame member. The mandrel then displaces the opposed frame member and enlarges the opening sufficiently to permit movement of the transparency through the opening. Although, with commercial embodiments of devices using such an arrangement, it is known to insert a guide channel adjacent to or into the enlarged opening between the frame members to guide the film, such guide channels do not intentionally tear the two frame members apart or rupture the seal as the integrity of the transparency holder must be maintained to fulfill its intended purpose. While it is known from U.S. Pat. No. 2,803,077 and 2,837,854, that a film member may be removed from a transparency holder by application of a sharp instrument between the joined frame members, there is no suggestion in the prior art of the combination of these teachings to open a film cartridge, as will become evident from the following description of the invention.

SUMMARY OF THE INVENTION

In accordance with the present invention, a preferred embodiment of a film cartridge supports a film member within a chamber defined by opposed walls which are sealed together to encapsulate the film member. A passage defined in one of the walls permits access to the opposed wall by a cartridge opening member which ruptures the cartridge.

A film cartridge of the present invention may be opened for removal of the film member by supporting the cartridge in an opening position, rupturing the cartridge with force-applying members which pass through the passage in a wall of the cartridge, and propagating the rupture until the film member can be removed from between the opposed walls.

A preferred embodiment of the present invention includes apparatus for supporting the cartridge in an opening position, force-applying members for initiating a rupture of the cartridge, and a wall-separating member for propagating the rupture until the film member can be removed from the cartridge.

More specifically, in accordance with a preferred embodiment, the cartridge comprises a pair of opposed, generally planar walls which are permanently sealed together to encapsulate the film disk in a light-tight chamber defined therebetween. To assist in opening of the film cartridge, one of the walls of the cartridge has passages therethrough which are adapted to receive force-applying members of an opener and permit the members to engage and displace the opposed walls. Force applied to the opposed wall by the force-applying members ruptures the seal and/or the wall of the cartridge. A wedge-shaped wall-separating member is inserted into the rupture and is moved transverse the chamber to propagate or extend the rupture by continued tearing of a wall and/or fracturing the seal between the walls.

BRIEF DESCRIPTION OF THE DRAWINGS

For a more complete understanding of the present invention, as well as further advantages and features thereof, reference should be had to the following detailed description of the invention taken in conjunction with the accompanying drawings, in which:

FIG. 8 is a perspective view, corresponding to FIG. 6, illustrating the casing when it is first ruptured by the opening apparatus;

FIG. 9 is a partial sectional view taken along line 9—9 in FIG. 8 depicting the sealed edge of the cartridge prior to opening;

FIG. 10 is a perspective view corresponding to FIG. 7, illustrating the casing partly opened by the apparatus of FIGS. 3 and 4; and FIG. 11 is a partial sectional view taken along line 11—11 in FIG. 10 depicting the cartridge subsequent to opening.

DESCRIPTION OF THE PRESENTLY PREFERRED EMBODIMENT

Film disks and cooperating cartridge assemblies are fully illustrated and described in commonly assigned co-pending U.S. Patent Application Ser. No. 774,716, entitled PHOTOGRAPHIC FILM UNIT AND CARTRIDGE ASSEMBLY, filed on Mar. 7, 1977, in the name of Donald M. Harvey; Ser. No. 931,053, entitled PHOTOGRAPHIC FILM CARTRIDGE ASSEMBLY AND CAMERA, filed Aug. 4, 1978 in the name of Gurdip S. Sethi; and Ser. No. 948,367, entitled FILM PACKET, filed Oct. 4, 1978 in the names of Frederick W. Harvey and Gurdip S. Sethi. The disclosure of the last-mentioned application is incorporated by reference into this description of the presently preferred embodiment so that the remainder of the description can be directed more particularly to elements forming part of or cooperating directly with the present invention.

Figure 1:
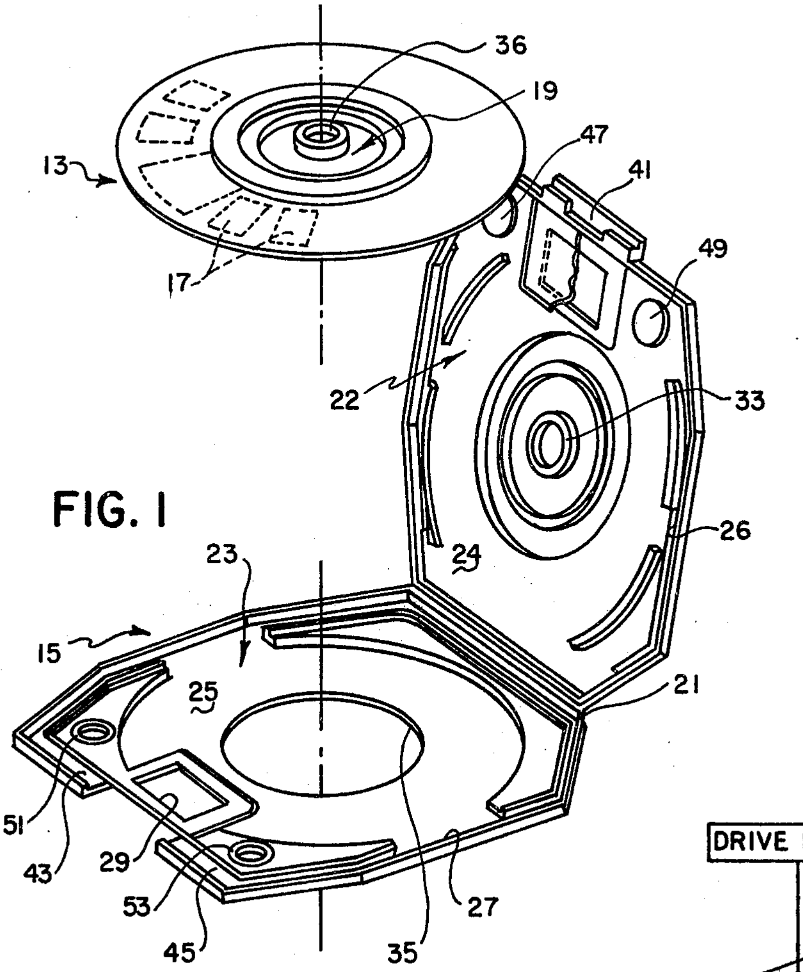
FIG. 1 is a perspective view of a film cartridge according to the present invention, shown prior to assembly with the film disk removed.

Referring now to FIG. 1, the preferred embodiment of the film cartridge is depicted as comprising a thin, generally flat cartridge assembly 11 for enclosing a film disk 13 and protective casing 15.

The film disk is a flat sheet of moderately-flexible, but self-supporting material, coated with suitable photosensitive layers for recording latent images. Although the images can be located on the disk in a number of different orientations, in the preferred embodiment a plurality of image areas are circularly disposed between the outer disk periphery 17 and a centrally located hub 19.

The cartridge casing 15 includes two generally planar walls 22 and 23, having respective interior surfaces 24 and 25, surrounded by respective generally circular (e.g. hexagonal) peripheral rims 26 and 27. FIG. 1 depicts the casing walls opened about a central hinge portion 21, with the film disk removed, but it should be understood that the casing, when closed, encloses the disk to protect it both physically and photographically. In the closed condition, the respective rims of the casing parts engage one another radially-outwardly of the film disk, to define the casing rim, while the walls of the parts are spaced apart to define a parallel layered construction (see FIG. 9) with the disk rotatably sandwiched between the respective casing walls. Film-disk security is provided by joining or sealing the cartridge parts together at rims 26 and 27, such as by ultrasonic welding. If the cartridge includes a hinge portion 21, sealing may not be required adjacent the hinge to provide for the light-tight environment generally afforded by the wall structure and the seal.

The casing provides a relatively secure housing for the film disk to discourage tampering by the amateur photographer. At the same time, however, the casing allows for convenient access to the disk by cooperating camera mechanisms, and for removal of the disk from the casing by the photofinisher.

Camera access is through an exposure aperture 29 and centrally aligned indexing apertures 33 and 35. By engaging the hub 19 of the film disk through the indexing apertures, the disk can be rotated on an axis passing through the center 36 of the hub, to successively position respective image frames relative to the exposure aperture. Of course, suitable light shields should be included to prevent fogging of the film through these apertures. Again, however, such details are not directly pertinent to the present invention, and can be better understood by referring to the previously mentioned U.S. Application Ser. No. 931,053 (entitled PHOTOGRAPHIC FILM CARTRIDGE ASSEMBLY AND CAMERA, filed in the name of Gurdip S. Sethi).

Figure 2:
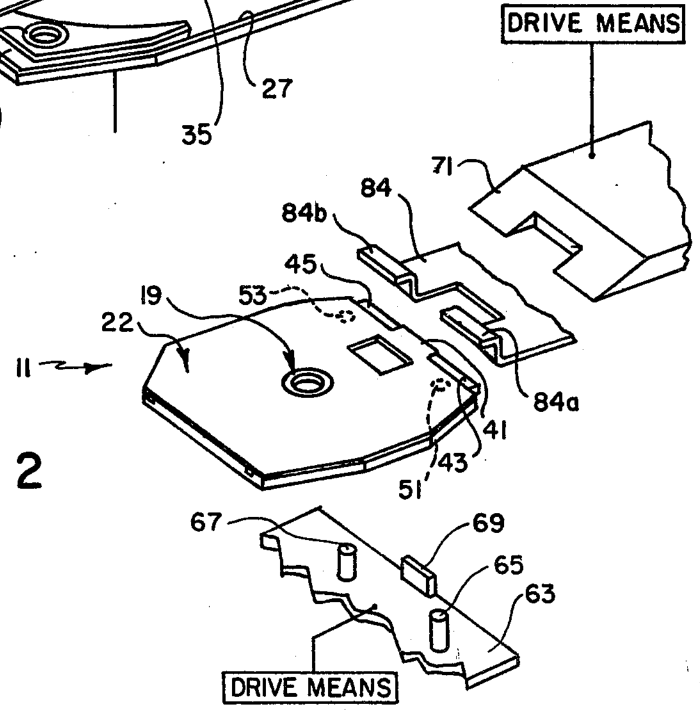
FIG. 2 is an exploded perspective view depicting portions of apparatus of the present invention for opening the cartridge, which is shown in the assembled condition.

Removal of the disk for processing and printing is accomplished, for example, by prying the casing apart at one edge, until it ruptures or fractures, and then propagating the rupture by tearing the casing from the initial fracture to its opposite edge. Of course, the cartridge may be pried open using a sharp instrument or prying blade, for example. However, such an approach may be undesirable for opening more than a few of the cartridges and some type of an opening device would undoubtedly be preferred by photofinishers. FIG. 2 depicts schematically a cartridge opener for opening film cartridges of the present invention in a more expeditious manner.

As viewed in FIGS. 1 and 2, the cartridge casing includes two opening constructions that cooperate with each other and the opening device to permit the cartridge to be opened by apparatus which will be described herein. First, one cartridge part or wall 22 includes a lip 41 that extends outwardly from rim 26 at the one edge of the wall, while the other cartridge part or wall 23 includes two similar but offset lips 43 and 45, spaced circumferentially on opposite sides of the lip 41. Second, wall 22 includes pads 47 and 49, adjacent the rim 26 at the same edge of the casing as lip 41, while the other cartridge part includes passages 51 and 53, which provide access to the pads from the other side of the casing. It will be understood that passages 51 and 53 can be apertures, as illustrated, or relieved areas at the periphery of wall 23.

The opening device depicted in FIG. 2, is adapted to receive the cartridge with the lips 84*a* and 84*b* of the stop member cooperating with offset lips 43 and 45 of the cartridge to hold the second part of the casing in a stationary position. Plate 63, carrying pins 65 and 67, and abutment 69, is moved by drive means into engagement with portions of the first casing part. The pins 65 and 67 constitute force-applying means and engage the pads 47 and 49, through apertures 51 and 53, while the abutment 69 engages lip 41. The plate 63 is then driven until the pins 65 and 67 rupture the cartridge and initiate opening of the cartridge. Next, a generally wedge-shaped wall-separating member 71 is driven by drive means through the rupture and between the interior surfaces 24 and 25 causing the initial rupture to extend across the cartridge towards its opposite edge and spacing the walls of the cartridge to permit access to the film.

While it is stated that the cartridge is ruptured at one edge and that the rupture is propagated by progressively tearing the cartridge apart to an opposite edge, it is pointed out that in point of fact seals and/or the walls of the cartridge may be ruptured depending upon the particular characteristics of the cartridge. If the seals between the walls are stronger than the walls, the rupture may occur by effecting tearing of a wall portion of the cartridge rather than separation or fracture of the seal. Accordingly, throughout the claims and specification, when it is stated that the cartridge is ruptured or torn apart, it is meant that the seal and/or the material comprising the walls is fractured to allow separation of the walls. Also, it should be noted that in general the location of the fracture is unimportant as long as the walls may be sufficiently separated to permit removal of the film disk. However, it is desirable that the initial rupture be located within a predefined region of the cartridge, which is preferably near an edge. Such a location of the initial rupture permits portions of the opening apparatus to be more readily aligned with the rupture and inserted therethrough for opening the cartridge by propagating or extending the rupture.

Figure 3:
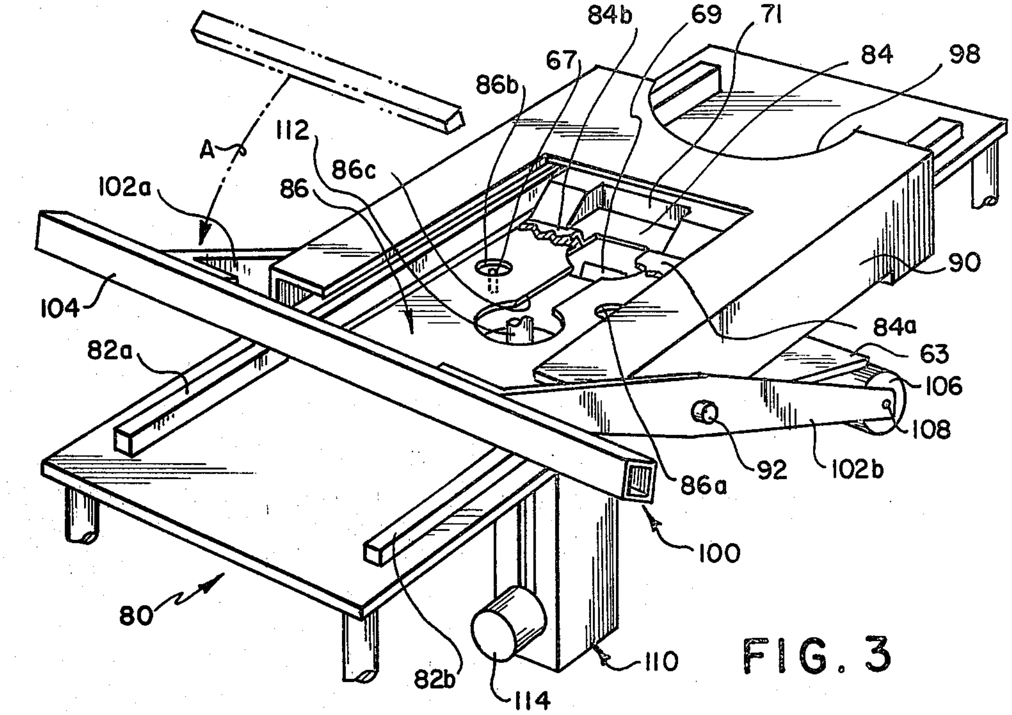
FIG. 3 is a perspective view of the opening apparatus with portions broken away.
Figure 4:
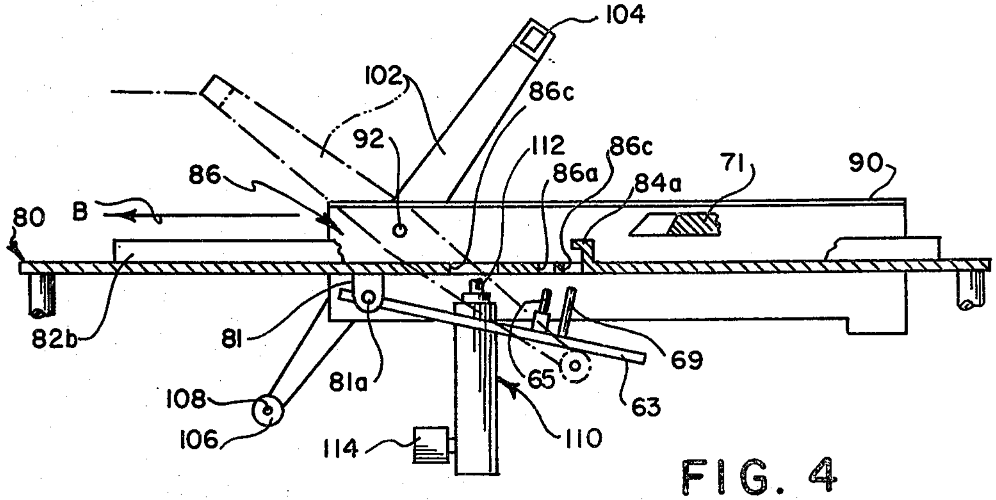
FIG. 4 is an elevational view of the opening apparatus with portions broken away.

Referring now to FIGS. 3 and 4, the cartridge-opening means depicted in FIG. 2 are shown embodied in a hand-operated cartridge opener which is suitable for receiving and opening cartridges of the present invention including features previously described. It is to be appreciated that other embodiments of the opener may be envisioned but the concepts employed in opening a cartridge of the present invention will generally be those described herein. The cartridge opener comprises a main supporting base 80 which carries vertical guide members **82*a*, 82*b* and a stop member 84. The base, guide members, and stop member jointly define a cartridge-receiving station 86 which is adapted to receive and support a cartridge in an aligned cartridge-opening position. Preferably, stop member 84 includes overhanging lip portions 84*a* and 84*b* which are spaced from the base 80 by a predetermined distance sufficient to permit lips 43 and 45** of the cartridge to be received in the cartridge-receiving station between the overhanging lip portions and the base.

A carriage 90 is carried by the base 80 for translational movement by using conventional guiding arrangements (not illustrated) which cooperate with guide members **82*a*, 82*b*, for example. Also, stops or other devices (not illustrated) for limiting the desired movement of the carriage with respect to the base 80** may be employed as necessary or as desired.

A generally symmetrical handle assembly 100 is pivotally supported by a pair of axles (such as axle 92) affixed to opposite sides of carriage 90. The axles pass through openings in central portions of arms **102*a* and 102*b* which are attached to opposed ends of a control handle 104. A pair of rollers (such as roller 106) are rotatably supported at the lower ends of the arms 102*a* and 102*b* by axles (such as axle 108). The rollers transmit force from the handle assembly 100 to plate 63** as will be described later.

A wall-separating member 71 is supported by the carriage 90 for translational movement relative to the cartridge-receiving station 86. As viewed in FIG. 7, for example, the wall-separating member 71 passes by the abutment 69 and stop 84 during the translational movement. The wall-separating member illustrated and described herein comprises a generally wedge-shaped member which is bifurcated to cooperate with sealed areas of the cartridge. However, as is known from the art of cartridge openers, wall-separating or wall-removing member may assume other configurations depending upon the exact nature of the opener in which the members are employed. For example, if the wall-separating member were intended to enter the rupture and then generally circumscribe the film disk to propagate the rupture, perhaps a single blade would be desirable. Accordingly, the term wall-separating member as used in the specification and the claims is intended to include any member which separates or spaces portions of the walls of the cartridge to permit removal of a film member by propagating or extending a rupture.

Figure 5:
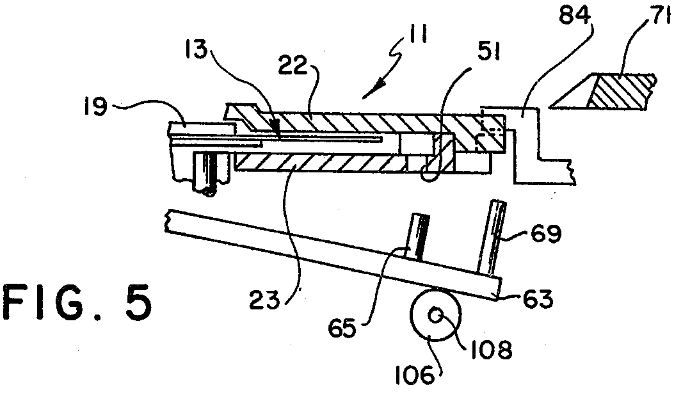
FIGS. 5-7 are partial cross-sectional views of the cartridge casing and apparatus of FIGS. 1 through 4, depicting successive steps in the operation of the apparatus.
Figure 6:
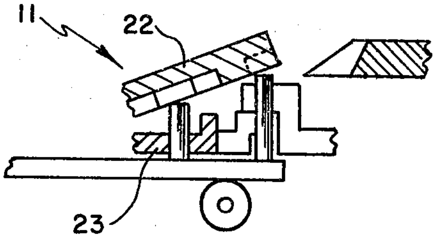
Figure 7:
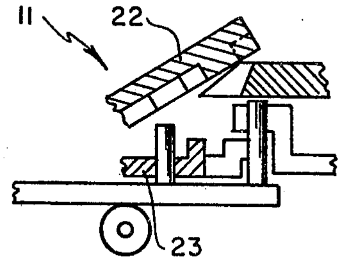

Previously mentioned plate 63 is pivotably supported by a pair of axles (such as axle **81*a*) carried by tabs (such as tab 81) which extend downward (as viewed in FIGS. 3 and 4) from opposed sides of base 80. Plate 63 carries a pair of spaced pins or force-applying members 65 and 67 and a projecting abutment 69. Pins 65 and 67 are adapted to cooperate with a received cartridge to initiate a rupture in a wall of the cartridge or in a seam joining walls. Abutment 69 may be considered optional but in the embodiment disclosed serves to further spread the walls adjacent the rupture to permit access by the wall-separating member. As viewed in FIG. 3, base 80 defines openings 86*a* and 96*b* which are adapted to receive pins 65 and 67 therethrough to cooperate with a cartridge received in the cartridge-receiving station 86. Opening 86*c* defined by base 80 similarly receives abutment 69 therethrough. As illustrated in FIGS. 5–7, plate 63 may be moved from a position wherein pins 65 and 67 and abutment 69 are spaced from the cartridge-receiving station 86** to a position wherein the pins and abutment cooperate with a cartridge received in the cartridge-receiving station to initiate a rupture of a wall of the cartridge.

When the presently preferred embodiment of the cartridge opener is used to open cartridges of the present invention, the operator aligns the cartridge with respect to the opener as shown in FIG. 3 and rests the cartridge on supporting base 80. The cartridge is then slid to the cartridge-receiving station 86 by moving the cartridge between guide members **82*a* and 82*b* until it abuts stop member 84 with lips 43 and 45 of the cartridge between the overhanging lip portions 84*a* and 84*b* and the base 80**.

The operator then initiates pivotal movement of handle 104 (in the direction indicated by arrow A) moving the rollers supported at the lower ends of arms **102*a* and 102*b* into contact with plate 63 which supports projecting pins 65 and 67 and abutment 69. Plate 63 is pivotably displaced by the rollers to a position wherein pins 65 and 67 are moved through openings 86*a* and 86*b* in base 80 and are registered with openings 51 and 53 of the cartridge. Such registration of the pins and the wall portions surrounding the openings ensures that the cartridge has been properly oriented and positioned in cartridge-receiving station 86. Continued pivotal movement of handle 104 in the direction of arrow A moves pins 65 and 67** into pressure contact with interior surface 24 or pads 49 and 47 which are considered extensions of the interior surface 24 of wall 22 and initiates separation of wall 22 from wall 23 by tearing a wall and/or breaking the seal between the walls 22 and 23, as shown in FIGS. 6 and 8. Lips 43 and 45 cooperate with stops 84*a* and 84*b* of the stop 84 to prevent vertical displacement of the cartridge as wall 22 is displaced by pins 65, 67 and abutment 69.

After the cartridge has been ruptured and the wall 22 slightly separated from wall 23, handle 104 is moved by the operator in a horizontal direction (indicated by arrow B) moving carriage 90 transverse to the cartridge-receiving chamber 86. Wall-separating member 71 supported by carriage 90 is forced into the rupture which has been created betweens walls 22 and 23. As the wall-separating member is moved through the rupture, it is moved between the film disk and the interior surface 24 of wall 22. Continued movement of the wall-separating member propagates the rupture of the cartridge (as shown in FIGS. 7 and 10) substantially from the initial rupture (FIG. 8) toward the opposite edge separating the walls 22 and 23 from the assembled position (FIG. 9) to a spaced position (FIG. 11). Such movement of the wall-separating member 71 displaces wall 22 and any other portions of the cartridge positioned above the film disk 13. As the carriage is moved to propagate the rupture, the lower ends of arms 102*a* and 102*b* freely roll along the lower surface of plate 63 (see FIG. 7) thereby maintaining the pins 65 and 67 in openings 51 and 53 of the cartridge and preventing displacement of the cartridge by the wall-separating member.

After the rupture has been sufficiently propagated to permit removal of the film disk, the operator may return the carriage 90 to the original position for permitting the cartridge to be removed from the cartridge-receiving station 86 and whereby the film disk may be manually extracted from the cartridge. Alternatively, the operator may continue to move the carriage in the direction of arrow B to completely displace wall 22 from covering the disk. Depending upon characteristics of the cartridge, continued movement of carriage 90 may result in wall-removing member 71 either shearing the cartridge hinge 21 and removing wall 22 or rotating wall 22 about hinge 21 to a position wherein walls 22 and 23 are generally in the same plane.

It will be noted in FIG. 3 that the carriage 90 includes a curved cut-away portion 98 which permits the disk to be passed therethrough. This cut-away portion 98 minimizes the distance necessary for carriage 90 to travel before passing over the film disk. When the carriage 90 has been moved to the position wherein the cut-away portion 98 has cleared the film disk, that portion of the carriage 90 adjacent to cut-away portion 98 and the stop lips 84*a*, 84*b* cooperate with portions of the cartridge to prevent displacement of wall 23 from the cartridge-receiving station 86. It will be appreciated that such an arrangement is ideal to permit removal of the film disk from the cartridge by a spindle 112 of film-removing assembly 110, for example. As will be apparent, the spindle 112 may be moved by the operator moving a knob 114 which is coupled to the spindle. Spindle 112 then may cooperate with hub 19 to readily remove the film disk from the cartridge. The film disk may be removed by the operator or transferred to another spindle before retraction of the spindle 112 to the position shown in FIGS. 3 and 4.

Following removal of the disk by the spindle 112 of the film-removing assembly 100, the carriage 90 is returned to the original (FIG. 3) position to permit clearing of any remaining portions of the cartridge from the cartridge-receiving station. The carriage opener is then ready to receive another cartridge to be opened and the opening sequence may be repeated.

It will be noted from the foregoing description of the cartridge opener that many modifications may be made to automate the removal of the film disk from the cartridge. For example, it may be recognized from FIG. 2 that drive means of a different nature than the hand-operated mechanism described herein may be employed for effecting relative movement between the force-applying members and the cartridge for rupturing the cartridge and for effecting relative movement between the wall-separating member and the cartridge for propagating the rupture. Also, more elaborate film-removing assemblies may be employed such as an accumulating spindle or transfer spindle which may be directly coupled to processing equipment.

It should now be apparent that the structure of the present invention provides significant advantages not available from the teaching of the prior art. The cartridge can be welded tightly shut to protect the film and facilitate its intended use in photographic cameras, yet it can be opened reliably in a predictable manner by the film finisher. When the cartridge is opened, as described, the film disk may be removed in a direction normal to its flat dimension. Similarly, the cartridge may be positioned and supported in a predetermined position to permit appropriate apparatus to remove the disk from the cartridge either manually or automatically.

The invention has been described in detail with particular reference to an illustrative preferred embodiment thereof, but it should be understood that variations and modifications can be effected within the spirit and scope of the invention as described hereinabove and as defined in the appended claims.

What is claimed is:

1. A cartridge adapted to be opened by a cartridge opener, said cartridge comprising first and second generally planar and parallel walls sealed together to enclose a film member in a substantially light-tight film chamber located between and defined by portions of interior surfaces of said walls, said first wall having a passage spaced beyond the peripheral edge of said film member and directed toward said interior surface of said second wall for receiving force-applying means of the cartridge opener therethrough to apply force to said interior surface of said second wall and displace said second wall relative to said first wall, thereby rupturing the cartridge.

2. A cartridge as set forth in claim 1 wherein said first wall includes lip means which project beyond the periphery of said second wall for engagement by a portion of the cartridge opener to prevent displacement of said first wall when the force-applying means of the cartridge opener applies force to said interior surface of said second wall for rupturing said cartridge.

3. A cartridge adapted to be opened by a cartridge opener, said cartridge comprising first and second opposed walls sealed together near peripheral edge regions of said walls to enclose a film member between portions of interior surfaces of said walls, said first wall including means defining a pair of passages spaced beyond the peripheral edge of said film member and directed toward said interior surface of said second wall for receiving force-applying members of the cartridge opener therethrough to apply force to said interior surface of said second wall to rupture the cartridge and separate a peripheral area of said second wall from the corresponding area of said first wall to form an opening in which wall-separating means of the cartridge opener can be inserted between said interior surfaces of said first and second walls for separating the first and second walls from each other.

4. A cartridge as set forth in claim 3 wherein said first wall includes lip means which project beyond the peripheral edge of said second wall for engaging a portion of the cartridge opener to prevent displacement of said first wall when the force-applying means of the cartridge opener applies force to said interior surface of said second wall for separating the peripheral edges of said walls.

5. A cartridge for enclosing a film member and adapted to be received by a cartridge opener, said cartridge comprising:

first and second walls sealed together proximate a peripheral edge region thereof for encapsulating said film member between portions of interior surfaces of said walls, said first wall including passages proximate the seal between said walls and directed toward said interior surface of said second wall for receiving force-applying members of the cartridge opener therethrough to apply force to the interior surface of said second wall for rupturing said sealed region and displacing said second wall to facilitate entry of wall-separating means of the cartridge opener between said interior surfaces of said walls to separate said walls until said film member can be removed from said cartridge.

6. A film disk-containing cartridge adapted to be opened by a cartridge opener of the type having (1) rupturing means movable in a first direction to register the cartridge in the opener and to rupture the cartridge and (2) wall-separating means movable in a second direction generally perpendicular to said first direction to propagate the rupture, said cartridge comprising:

first and second opposed walls sealed together encapsulating the film disk between interior surfaces of said walls, said first wall including a pair of spaced passages located outside the peripheral edge of said film disk for receiving rupturing means which apply force to the opposed wall to rupture the cartridge and separate said walls, thereby facilitating entry of the wall-separating means of the opener between said interior surfaces of said walls, said first wall including surfaces complementary said passages adapted to cooperate with the rupturing means to register the cartridge in the cartridge opener and to restrain movement of the cartridge when the wall-separating means of the opener is moved in said second direction to propagate the rupture.

7. A film disk-containing cartridge adapted to be opened by a cartridge opener of the type havine (1) a pair of force-applying members movable in a first direction to register said cartridge in the opener and to rupture said cartridge and (2) a wall-removing member movable in a second direction to tear said cartridge apart, said cartridge comprising:

a casing having first and second wall sections folded about a central hinge portion, said wall sections being sealed together proximate their peripheral edges to encapsulate a film disk in a substantially light-tight chamber, said first wall section having a pair of spaced passages positioned proximate the seal between said first and second wall sections, said passages for receiving the force-applying members which pass therethrough and apply force to said second wall section to rupture said cartridge and separate said first and second wall sections thereby facilitating entry of the wall-removing member between said first and second wall sections, said first wall section including sufaces complementary said passages adapted to cooperate with the force-applying members for registering said cartridge in the cartridge opener and for restraining movement of said cartridge when the wall-removing member of the opener is moved in said second direction for propagating the rupture.

8. A method of opening a cartridge to release a film member from a chamber at least partially defined by first and second generally planar and generally parallel walls sealed together enclosing the film member, said first wall having passages to receive force-applying members therethrough, said method comprising:

(a) exerting a force through said passages against said second wall to displace the second wall relative to said first wall and rupture the cartridge; and
(b) propagating the rupture in the cartridge by wedging apart said walls through the rupture sufficiently to permit removal of the film member.

9. A method of opening a cartridge to release a planar film member from a chamber defined by first and second opposed walls sealed together enclosing the film member, said method comprising:

(a) exerting force against respective peripheral areas of said walls in opposite directions generally perpendicular to the plane of said film to rupture the sealed cartridge and separate said peripheral areas; and
(b) exerting on the separated peripheral areas of said walls a wedging force in a direction generally parallel to the plane of said film to separate said walls.

10. A method of opening a film cartridge to permit removal of a film member from a sealed chamber defined by generally planar and parallel walls, one of the walls having passages which permit access from outside the cartridge to the opposed parallel wall, said method of opening the cartridge comprising the steps of:

(a) effecting relative movement between the cartridge and force-applying means to move the force-applying means through the passages and into engagement with the opposed wall to register the cartridge;
(b) continuing relative movement between the cartridge and the force-applying means to rupture the cartridge and separate the opposed walls adjacent to the rupture; and
(c) effecting relative movement between the cartridge and a wall-separating member to move the wall-separating member through the rupture separating the walls relative to each other and extending the rupture until the film member is removable from the cartridge.

11. A method of opening a film cartridge having a film disk enclosed between interior surfaces of first and second opposed walls which are sealed together along an area spaced beyond the peripheral edge of the film disk, the first wall having passages directed in a first direction leading from the exterior surface of the first wall toward the interior surface of the second wall, the passages being spaced apart and positioned proximate the sealed area, the first wall including a lip portion which extends beyond the peripheral edge of the second wall, the lip portion being accessible from a second direction generally opposed to the first direction, said method comprising the steps of:

(a) engaging the lip portion of the first wall for restraining the first wall from displacement in the first direction;

(b) exerting force through the passages in the first direction against the interior surface of the second wall to rupture the cartridge; and (c) wedging apart said walls through the rupture to propagate the rupture until the film member is removable from said film chamber.

12. A method of opening a film cartridge having a generally planar film member encapsulated between interior surfaces of first and second opposed walls which are sealed together along an area spaced beyond the peripheral edge of the film member, the first wall having a passage permitting access in a first direction from the exterior of the cartridge to the interior surface of the second wall, the first wall further including a lip portion extending beyond a peripheral edge of the second wall for access in a second direction generally opposed to the first direction, said method comprising:

(a) engaging the lip portion of the cartridge to restrain the first wall from movement in the first direction;

(b) exerting force through the passage to the interior surface of the second wall in the first direction to separate respective peripheral areas of the first and second walls sufficiently to permit access between the interior surfaces of the first and second walls; and (c) exerting on the separated peripheral areas of the walls a wedging force in a third direction generally transverse to the film member to separate the walls until the film can be removed from the cartridge.

13. An opener for a film cartridge having a generally planar film member encapsulated between interior surfaces of first and second opposed walls which are sealed together along an area spaced beyond the peripheral edge of the film member, the first wall having a passage permitting access in a first direction from the exterior of the cartridge to the interior surface of the second wall, the first wall further including a lip portion extending beyond a peripheral edge of the second wall for access in a second direction generally opposed to the first direction, said opener comprising:

(a) means for engaging the lip portion of the cartridge to restrain the first wall from movement in the first direction;

(b) force-applying means movable into the passage for applying force in the first direction to the interior surface of the second wall for rupturing the cartridge sufficiently to permit access between the interior surfaces of the first and second walls; and (c) wall-separating means movable through the rupture and between the interior surfaces of the first and second walls, said wall-separating means being movable in a third direction generally transverse to the film member for propagating the rupture until the film can be removed from the cartridge.

14. An opener as set forth in claim 13 wherein said force-applying means includes pin means having a surface engageable with a cartridge surface complementary said passage for positioning the cartridge in the opener and for restraining the first wall of the cartridge from movement in said third direction when said wall-separating means is moved in said third direction.

15. An opener as set forth in claim 13 wherein said wall-separating means includes a generally wedge-shaped member having a relatively thin leading edge for insertion into the rupture, said third direction being generally parallel to the plane defined by the planar film member.

16. An opener for a film cartridge having first and second generally planar and parallel walls which are sealed together encapsulating a film member between interior surfaces of the walls, the first wall having at least one passage therethrough permitting access to the interior surface of the second wall, said opener comprising:

(a) a housing including means for supporting a received cartridge in a predetermined position;

(b) force-applying means movable relative to the received cartridge, said force-applying means being adapted to enter said passage for applying force to the interior surface of the second wall and for displacing said second wall relative to said first wall to initiate a rupture in the film cartridge; and (c) wall-separating means supported by said housing for movement relative to the received cartridge the wall-separating means being adapted to enter the rupture in the film cartridge and move relative to the first and second walls for extending the rupture until the film member can be evacuated.

17. A cartridge opener as set forth in claim 16 wherein said wall-separating means includes a wedge-shaped member, and means for moving said member progressively into the rupture to enlarge the rupture until the film member can be removed.

* * * * *